United States Patent
Nakatani et al.

(10) Patent No.: US 10,730,117 B2
(45) Date of Patent: Aug. 4, 2020

(54) TOOL CHUCK, TOOL HOLDING METHOD AND TOOL REMOVING METHOD

(71) Applicant: BIG DAISHOWA CO., LTD., Osaka (JP)

(72) Inventors: Joji Nakatani, Osaka (JP); Hirokazu Suruga, Osaka (JP)

(73) Assignee: Big Daishowa Co., Ltd., Osaka (JP)

( * ) Notice: Subject to any disclaimer, the term of this patent is extended or adjusted under 35 U.S.C. 154(b) by 0 days.

(21) Appl. No.: 16/087,842

(22) PCT Filed: Sep. 6, 2016

(86) PCT No.: PCT/JP2016/076104
§ 371 (c)(1),
(2) Date: Sep. 24, 2018

(87) PCT Pub. No.: WO2018/047221
PCT Pub. Date: Mar. 15, 2018

(65) Prior Publication Data
US 2019/0118269 A1   Apr. 25, 2019

(51) Int. Cl.
*B23B 31/20*   (2006.01)

(52) U.S. Cl.
CPC ............ *B23B 31/20* (2013.01); *B23B 31/201* (2013.01); *B23B 2231/20* (2013.01); *B23B 2231/2008* (2013.01); *B23B 2260/106* (2013.01)

(58) Field of Classification Search
CPC ... B23B 31/20; B23B 31/201; B23B 2231/20; B23B 2231/2008; B23B 2231/2078;
(Continued)

(56) References Cited

U.S. PATENT DOCUMENTS 2,358,300 A     9/1944   Benjamin et al.
2,491,167 A *  12/1949  Drew .................... B23B 31/202
                                                                   279/48
(Continued)

FOREIGN PATENT DOCUMENTS

CN    108778587 A    11/2018
JP    S53-11779 U    1/1978
(Continued)

OTHER PUBLICATIONS

Office Action dated Aug. 29, 2019 in counterpart Chinese application.
(Continued)

*Primary Examiner* — Eric A. Gates
*Assistant Examiner* — Chwen-Wei Su
(74) *Attorney, Agent, or Firm* — Dilworth & Barrese, LLP

(57) ABSTRACT

Provided is a tool chuck that allows precision gripping of a tool by a collet when this collet is pushed into a chuck body. The tool chuck includes a collet for gripping a tool, a chuck body having, at a leading end thereof, a receiving portion for receiving the collet inserted therein along an axis thereof, a holder containing the collet therein and configured to be movable together with the collet along an axial direction based on the axis, and a nut fitted on the chuck body (2) in a radial direction based the axis and containing the holder in the radial direction. The holder has a movement allowing mechanism for allowing the holder to move relative to the nut along the axial direction when the nut is moved relative to the chuck body along the axial direction.

6 Claims, 7 Drawing Sheets

(58) Field of Classification Search
CPC .......... Y10T 279/14; Y10T 279/17299; Y10T 279/17471; Y10T 279/17376; Y10T 279/17701; Y10T 279/26; Y10T 279/17495; Y10T 279/17504; Y10T 279/17512; Y10T 279/17017
See application file for complete search history.

(56) References Cited

U.S. PATENT DOCUMENTS

| | | | |
|---|---|---|---|
| 3,195,909 A | | 7/1965 | Winnen |
| 3,552,756 A | * | 1/1971 | Christensen .......... B23B 31/026 |
| | | | 279/6 |
| 3,894,743 A | * | 7/1975 | Hiroumi ................. B23B 31/20 |
| | | | 279/47 |
| 5,193,825 A | | 3/1993 | Kanaan et al. |
| 5,314,198 A | | 5/1994 | Kanaan et al. |
| 5,975,817 A | * | 11/1999 | Komine ................ B23B 31/001 |
| | | | 409/136 |
| 9,849,520 B2 | * | 12/2017 | McCormick ........... B23B 31/02 |
| 2003/0132580 A1 | | 7/2003 | Komine |
| 2009/0322042 A1 | | 12/2009 | Kitamura |
| 2012/0119450 A1 | | 5/2012 | Komine |
| 2019/0118269 A1 | | 4/2019 | Nakatani et al. |

FOREIGN PATENT DOCUMENTS

| | | |
|---|---|---|
| JP | S59-6964 Y2 | 3/1984 |
| JP | S59-52807 U | 3/1984 |
| JP | H06-23608 A | 2/1994 |
| TW | 232667 B | 10/1994 |
| TW | 536443 B | 6/2003 |
| TW | 201130597 A | 9/2011 |
| TW | 201412437 A | 4/2014 |
| WO | 2008/053638 A1 | 5/2008 |
| WO | 2010/134473 A1 | 11/2010 |

OTHER PUBLICATIONS

Translation of the International Preliminary Report on Patentability from PCT/JP2016/076104 dated Mar. 21, 2019.
Taiwan Office Action dated Dec. 25, 2019.

* cited by examiner

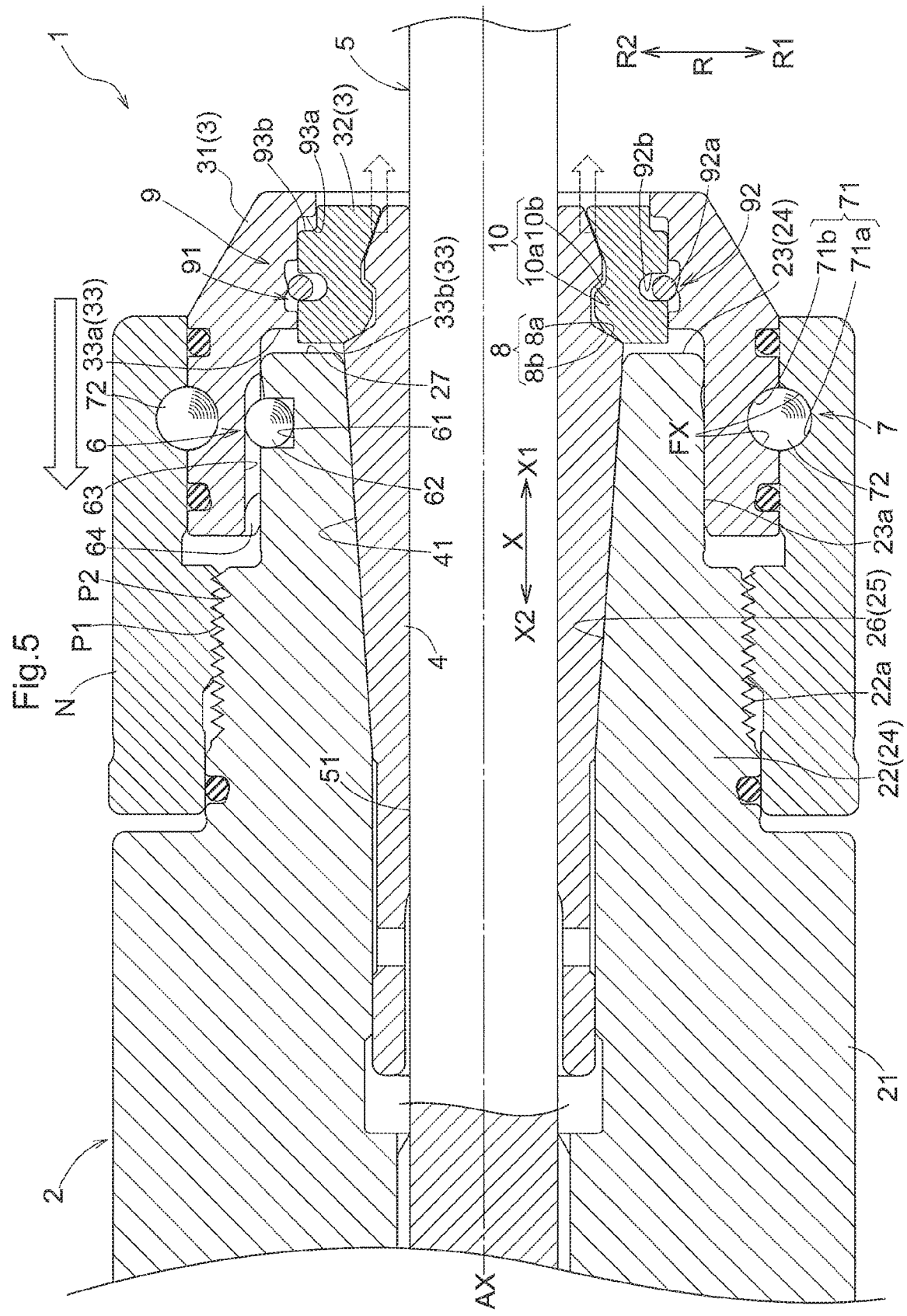

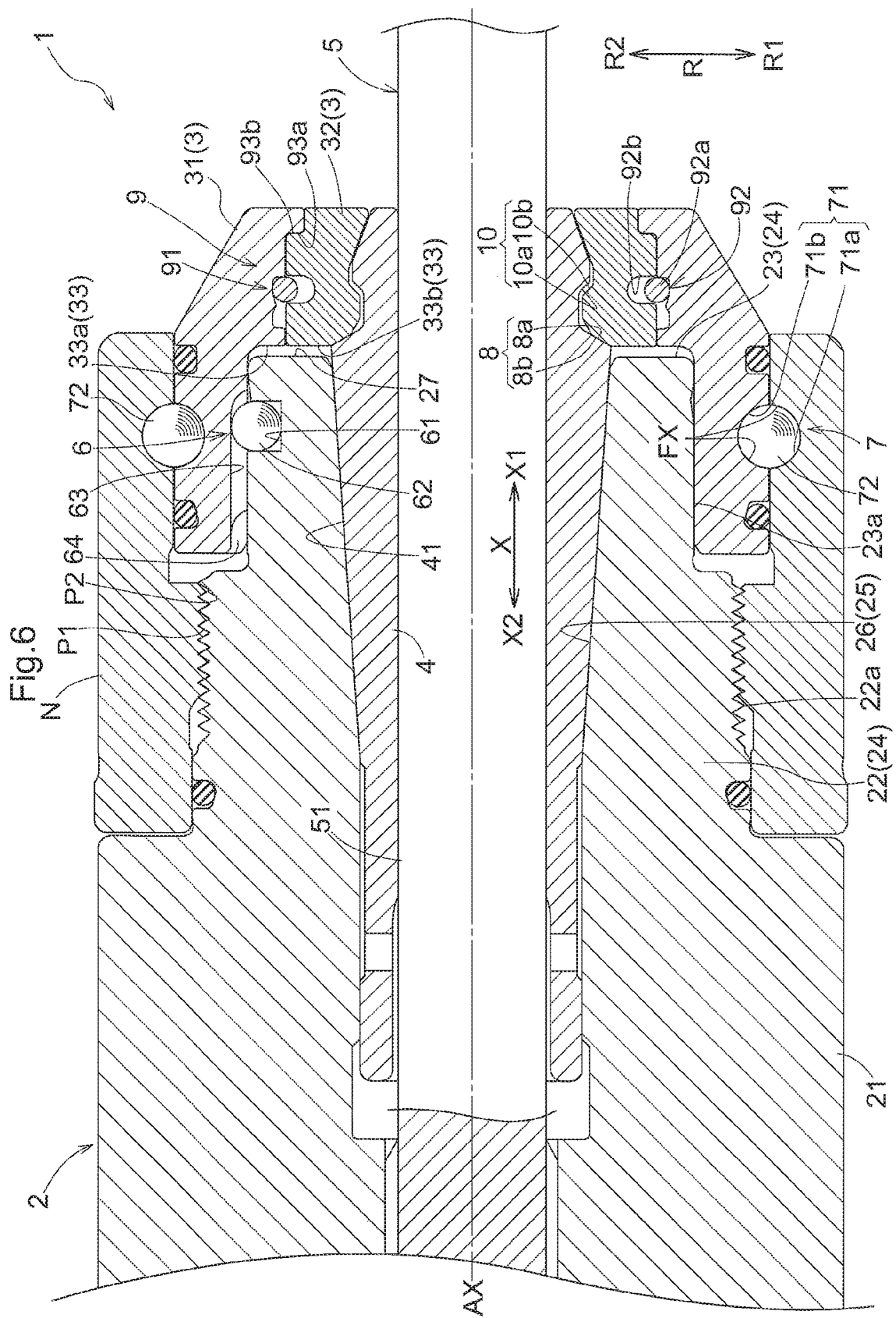

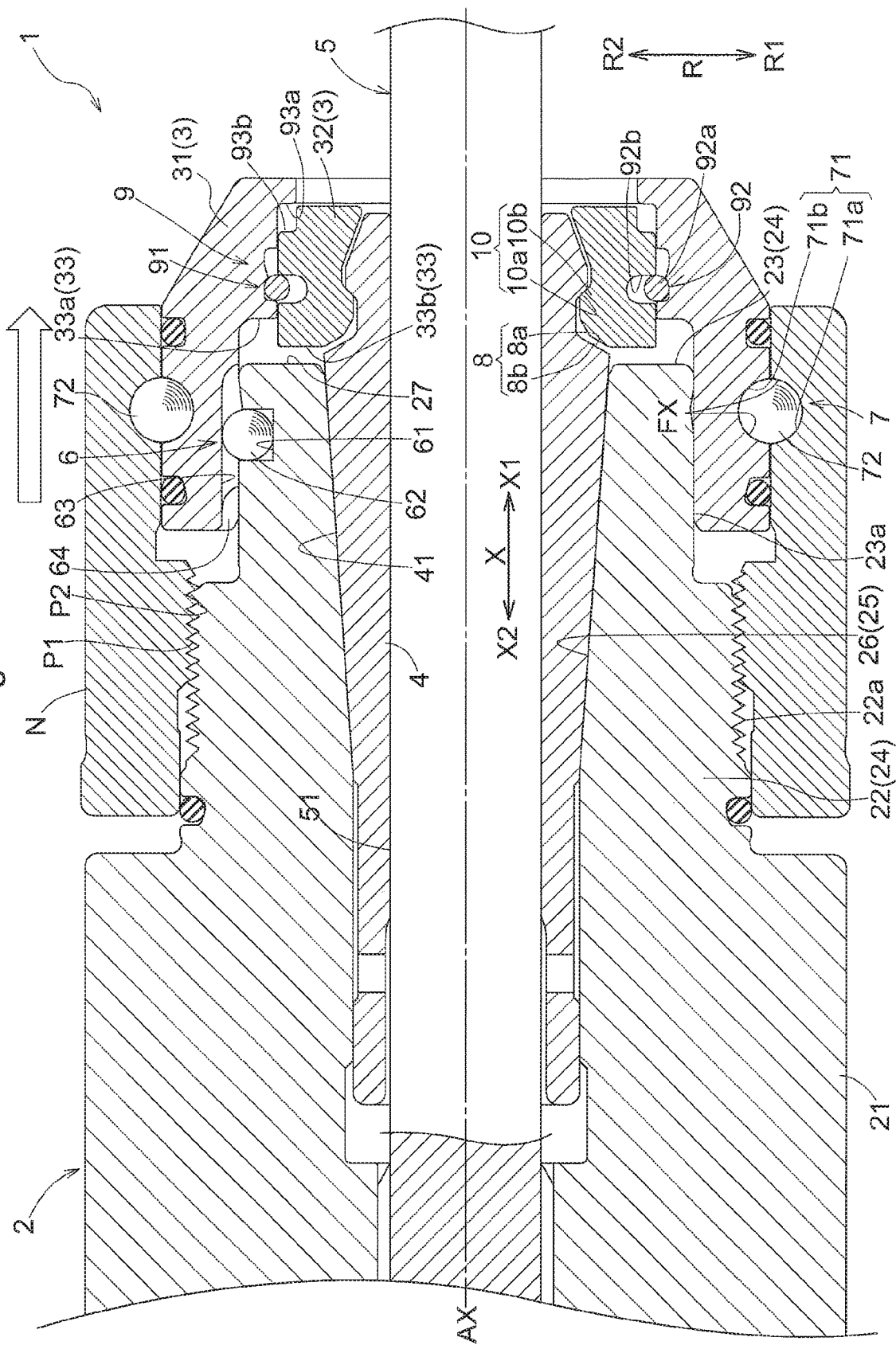

TOOL CHUCK, TOOL HOLDING METHOD AND TOOL REMOVING METHOD

TECHNICAL FIELD

The present invention relates to a tool chuck configured to grip a shank portion of a tool inserted into a chuck body.

BACKGROUND ART

In recent years, with evolution of a machining tool, a maximum rotational speed of a spindle has been increasing. In particular, in metal mold machining and micro machining, there is an increasing need for a small-diameter high-precision chuck capable of withstanding precision machining at a super high speed rotation. For realizing such high precision chuck, it is needed to cause a rotational axis of the chuck to agree with an axis of the shank portion of the tool to be gripped thereto.

For instance, PTL 1 discloses a tool chuck including a chuck body having a tubular portion coaxial with a rotational axis, a nut having a female screw in its inner circumference to be screwed with a male screw formed in an outer circumference of the tubular portion to be fitted on this tubular portion, a holder contained in the nut and a collet contained and held within this holder, such that the tool chuck is configured to grip the shank portion of the tool by the inner circumferential face of the collet. With such tool chuck, by screwing the nut into the chuck body, the holder and the collet held thereto can be pushed to the inner side into the tubular portion.

CITATION LIST

Patent Literature

PTL 1: Japanese Unexamined Utility Model Application Publication S53-011779

SUMMARY

Technical Problem

With such conventional tool chuck as the one disclosed in PTL 1, the screwing-in operation of the nut to the tubular portion of the chuck body is done manually. So, a slight displacement of the collet axis off the rotational axis may occur when the collet is pressed to the inner side in the tubular body by the screwing-in operation of the nut. Or, similar situation may occur also when inappropriate screw screwing occurs due to distortion present in the male screw of the tubular portion or the female screw of the nut. If the collet axis is misaligned with the rotational axis, this will result in misalignment also of the axis of the shank portion of the tool gripped by the collet relative to the rotational axis.

The present invention has been made in view of the above-described state of the art and its object is to provide a tool chuck that allows precision gripping of a tool by a collet when this collet is pushed into a chuck body.

Solution to Problem

For accomplishing the above-noted object, according to a characterizing feature of a tool chuck relating to this disclosure, the tool chuck comprises:

a collet for gripping a tool;

a chuck body having, at a leading end thereof, a receiving portion for receiving the collet inserted therein along an axis thereof;

a holder containing the collet therein and configured to be movable together with the collet relative to the chuck body along an axial direction;

a nut fitted on the chuck body and movable relative to the chuck body in the axis direction, the nut containing the holder along a radial direction; and the holder having a movement allowing mechanism for allowing the holder to move relative to the nut along the axial direction when the nut is moved relative to the chuck body along the axial direction.

In the above arrangement, the collet which grips the tool is contained in the holder. The collet and the holder are arranged to be movable together along the axis direction. And, the holder is contained in the nut along the radial direction which is based on the chuck body. Thus, when the nut is moved relative to the chuck body along the axial direction, the holder and the collect move along the axial direction together with this nut. With this movement of the nut, the tool gripped by the collet will be mounted to the chuck body together with this collet. With this arrangement, the movement allowing mechanism allows the holder to move relative to the nut along the axial direction when the nut is moved relative to the chuck body along the axial direction. In general, as the collet is moved closer to the chuck body in the axial direction, a fastening force by the chuck body to the collet is increased progressively due to pressed contact between respective tapered faces thereof. And, as the collet fastened to the chuck body fastens the tool, mounting of the tool to the chuck body will be completed. In this, if the movement of the nut relative to the chuck body is continued in the presence of disagreement between the collet axis and the holder axis, the collet will be fastened to the chuck body with such disagreement between the respective axes thereof. As a result, the axis of the tool mounted to the chuck body will also be in disagreement with the axis of the chuck body. On the other hand, according to the inventive arrangement described above, in the course of continued movement of the nut, the holder is moved temporarily away from the chuck body in the axial direction. Thus, the fastening of the collet by the holder will be loosened, so that the collet will only be pressed lightly into the chuck body. As a result, the axis of the collet (the axis of the shank portion of the tool) will be brought into proper agreement with the axis of the chuck body. Then, as the movement of the nut is continued, the collet axis will be placed in precise agreement with the holder axis, and under this condition, the tool together with the collet will be mounted to the chuck body. Therefore, according to the inventive arrangement, the tool can be gripped by the collet in a precise manner when this collet is pushed into the chuck body.

In the above arrangement, preferably:

the holder includes a first holder member contained in the nut and a second holder member contained in the first holder member and containing the collet; and the first holder member and the second holder member are movable relative to each other along the axial direction.

With the above arrangement, in case the first holder member and the nut move together, as the second holder member is moved relative to the first holder member in the axial direction, this second holder member is moved relative also to the nut in the axial direction. Namely, with the above arrangement, although the second holder member is movable relative to the nut in the axial direction, the first holder member is movable together with the nut in the axial direction. With this arrangement of providing the first holder member and the second holder member movable relative to each other in the axial direction, the configuration can be formed simple.

In the above arrangement, still preferably:

the first holder member and the second holder member are formed annular about the axis; and the movement allowing mechanism includes an engaging protruding portion provided in one of the first holder member and the second holder member along a circumferential direction relative to the axis and an engaged receding portion provided in the other of the first and second holder members along the circumferential direction and engageable with the engaging protruding portion.

With the above arrangement, the first holder member and the second holder member are formed annular having a common axis and include an engaging protruding portion and an engaged receding portion engageable with each other in the respective circumferential directions thereof. With this arrangement, although the second holder member is temporarily movable in the axial direction relative to the first holder member, when the engaging protruding portion and the engaged receding portion are engaged with each other, the first holder member and the second holder member can be moved together in the axial direction. Namely, the force in the axial direction generated in association with the movement of the nut can be transmitted in a reliable manner to the second holder member via the first holder member. Consequently, the collet contained in the second holder member and the tool gripped by the collet can be moved in a reliable manner in the axial direction.

In the above arrangement, still preferably, the engaging protruding portion is comprised of a groove portion provided in the circumferential direction in one of the first and second holder members and an elastic ring disposed in the groove portion with a part of the elastic ring protruding from the groove portion.

With the above arrangement, under establishment of engagement between the engaging protruding portion which form a part of the elastic ring and the engaged receding portion, forces in opposite axial directions are applied to the first holder member and the second holder member, respectively. Thus, when a load in the axial direction is applied to the elastic ring, this axial load can be dissipated in the radial direction. And, by elastically contracting the elastic ring under the radial load in the radial direction to be fitted within the groove portion, the engagement between the engaging protruding portion and the engaged receding portion can be released, whereby the first holder member and the second holder member can now be rendered movable relative to each other in the axial direction.

In the above arrangement, still preferably:

the engaging protruding portion is elastically deformable in the radial direction; and the engaged receding portion includes a pair of small receding portions provided side by side along the axial direction and holding the engaging protruding portion and a small protrusion provided between the small receding portions and elastically deforming the engaging protruding portion in the radial direction.

The engaged receding portion is provided in either one of the first holder member and the second holder member and includes a pair of small receding portions provided side by side along the axial direction. The small receding portions hold the engaging protruding portion provided in the other one of the first holder member and the second holder member. When the small receding portions hold the engaging protruding portion, the first holder member and the second holder member are restricted in their relative movement in the axial direction. With the above-described inventive arrangement, when the first holder member and the second holder member are exerting the forces in the opposite axial directions against each other, one of the pair of small receding portions elastically deforms the engaging protruding portion in the radial direction from the condition of its holding this engaging protruding portion. With this elastic deformation of the engaging protruding portion in the radial direction, holding of the engaging protruding portion by the one small receding portion is released, so that the first holder member and the second holder member are moved relative to each other in the axial direction. Then, when the engaging protruding portion moves into the other small receding portion, the engaging protruding portion returns to its state prior to the elastic deformation, thus being retained in this other receding portion. Therefore, in this embodiment, by restricting/allowing the relative movement in the axial direction between the first holder member and the second holder member through utilization of holding of the engaging protruding portion by the small receding portions and the elastic deforming of the engaging protruding portion by the small protrusion, the movement allowing mechanism can provide its function.

In the above arrangement, still preferably, the engaged receding portion includes an inclined face between one of the pair of small receding portions which one is located farther from the chuck body and the protrusion.

Preferably, the tool is fixed by the chuck body by a tool holding method which comprises:

a first step of pressing the collet to a far inner side of the receiving portion when the nut, the holder and the collet are to be mounted to the chuck body;

a second step of causing the movement allowing mechanism to move the holder relative to the chuck body to a leading end side of the receiving portion as receiving a reaction force from the pressing at the first step; and a third step of pressing the collet again toward the far inner side of the receiving portion after the second step, thus fixing the tool to the chuck body.

With the above-described method, by the first step, the collet can be inserted into the receiving portion of the chuck body. And, by the second step, the holder can be moved slightly relative to the chuck body to the direction opposite to the inserting direction. At the time of insertion of the collet into the receiving portion at the first step, if there exists disagreement of the axis of the collet from the axis of the chuck body, by the second step, the holder will be moved in the opposite direction, namely, in the direction away from the chuck body, whereby the pressing to the collet can be temporarily released to bring the collet axis into agreement with the chuck body axis. Thereafter, at the third step, the collet is pushed to the far inner side of the receiving portion of the chuck body, so that the collet will be inserted into the receiving portion under the state of the agreement between the collet axis and the chuck body axis. And, under this state, the tool contained in the collet can be fixed to the chuck body. Therefore, with the inventive method described above, the tool can be fixed to the chuck body with agreement between the axis of the shank portion of the tool and the axis of the chuck body.

Further, preferably, the tool is removed from the chuck body by a tool removing method which comprises:

a first removing step for moving the nut in the direction away from the chuck body with the engaging protruding portion being kept in contact with the inclined face;

a second removing step for engaging the engaging protruding portion with the small receding portion; and a third removing step for moving the holder and the collet together in the direction away from the chuck body, thereby to remove the tool from the chuck body.

With the above-described method, by the first removing step, one of the first and second holder members having the engaging protruding portion and the other having the inclined face can move gently relative to each other along the axial direction. And, by the second removing step, the nut, the first holder member and the second holder member can move together along the axial direction. Further, by the third removing step, by moving the first holder member, the second holder member and the collet in the direction away from the chuck body along the axial direction, the tool gripped by the collet can be removed from the chuck body.

Further and other features and advantages of the techniques relating to this disclosure will become more apparent upon reading the following explanation on illustrative and non-limiting embodiments with reference to the accompanying drawings.

BRIEF DESCRIPTION OF DRAWINGS

FIG. 5 is a view illustrating how a holder is moved toward a leading end side of the receiving portion, FIG. 6 is a view showing a state when holding of the tool is completed, and FIG. 7 is a view illustrating how the tool is removed from the chuck body.

DESCRIPTION OF EMBODIMENTS

A tool chuck 1 relating to this embodiment will be explained with reference to the accompanying drawings.

Figure 1:
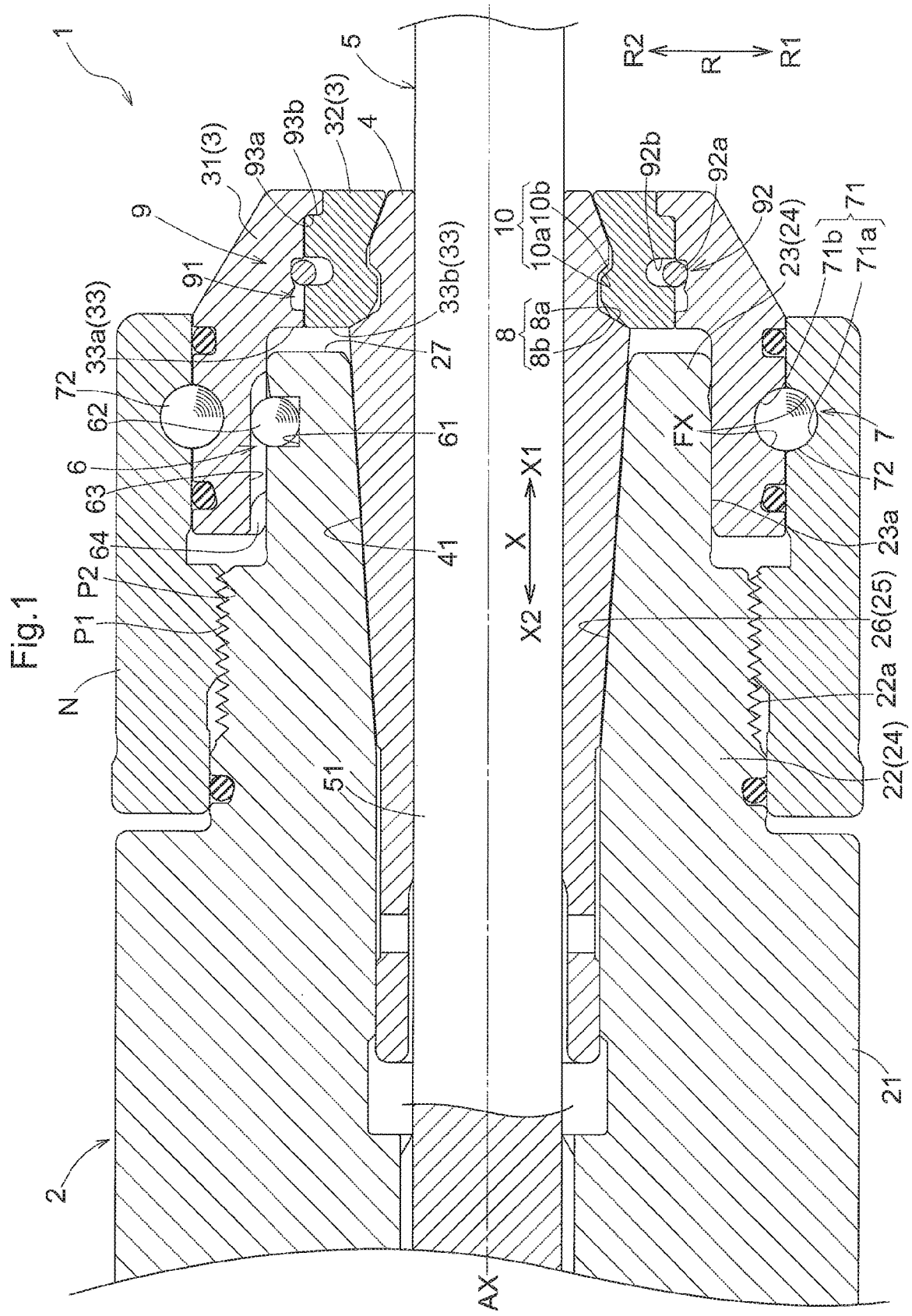
FIG. 1 is a section view showing a tool chuck relating to an embodiment.

As shown in FIG. 1, the tool chuck 1 includes a collet 4 for gripping a tool 5, a chuck body 2 having, at a leading end thereof, a receiving portion 25 for receiving the collect 4 inserted therein along an axis AX, a holder 3 configured to contain the collet 4 and to be movable together with the collet 4 along an axial direction X based on the axis AX, and a nut N fitted on the chuck body 2 in a radial direction R relative to the axis AX and containing the holder 3 in the radial direction R. Incidentally, the axis AX of the chuck body 2 corresponds to a rotational axis of the tool chuck 1. In the following discussion, the direction along the axis AX will be referred to as the axial direction X. And, based on this axial direction X, the side of the collet 4 being inserted into the receiving portion 25 of the chuck body 2 will be defined as an axial base end side X2 and its opposite side will be defined as an axial leading end side X1. Further, the direction perpendicular to the axis AX will be defined as the radial direction R and based on this radial direction R, the axis AX side thereof will be defined as a radial inner side R2 and its opposite side will be defined as a radial outer side R1, respectively.

In the outer circumference of the chuck body 2, a male screw P1 is formed. This male screw P1 of the chuck body 2 is configured to be screwed with a female screw P2 formed in the inner circumferential face of the nut N. Therefore, the nut N fitted on the chuck body 2 is arranged to be directly mounted to this chuck body 2 via the meshing between the male screw P1 and the female screw P2.

In the outer circumference of a leading end portion 23, there is formed a leading end outer circumferential face 23a which comes into abutment against the inner circumferential face of the holder 3. An intermediate portion 22 and the leading end portion 23 together form a tubular portion 24. This tubular portion 24 includes the receiving portion 25 capable of receiving the collet 4 inserted therein. And, in the inner circumferential face of the receiving portion 25, there is formed a tapered inner circumferential face 26 having a diameter which is progressively increased toward the axial leading end side X1.

The collet 4 has a tubular shape so as to contractively grip a shank portion 51 of the tool 5 from the radial outer side R1. The collet 4 as gripping the shank portion 51 is rotated together with the tool 5. In the outer circumference of the collet 4, there is formed a tapered outer circumferential face 41 which comes into abutment against the tapered inner circumferential face 26 of the receiving portion 25. The tapered outer circumferential face 41 is configured to have a diameter which is progressively increased toward the axial leading end side X1. Therefore, similarly to the tapered outer circumferential face 41, the tapered inner circumferential face 26 too is configured to have a diameter which is progressively increased toward the axial leading end side X1.

The holder 3 is contained to be rotatable relative to the nut N about the axis AX on the radial inner side R2 of this nut N. The holder 3 is configured to be movable together with the nut N along the axial direction X in association with a movement of the nut N relative to the chuck body 2 along the axial direction X through meshing engagement between the nut N and the chuck body 2. On the radial outer side R1 of the leading end portion 23 of the chuck body 2, the holder 3 is fitted to be movable relative to the leading end portion 23 along the axial direction X, but non-rotatable about the axis AX. Further, the holder 3 is configured also to hold the collet 4 from the radial outer side R1 and movable together with this collet 4 along the axial direction X. Such holder 3 is comprised of a first holder member 31 contained in the nut N and a second holder member 32 contained in the first holder member 31 and containing the collet 4 therein. The first holder member 31 and the second holder member 32 are formed annular about the axis AX. The first holder member 31 is disposed on the radial outer side R1 relative to the second holder member 32. Thus, the second holder member 32 is disposed on the radial inner side R2 relative to the first holder member 31.

The tool chuck 1 further includes a non-rotation mechanism 6 for restricting (inhibiting) relative rotation of the holder 3 relative to the chuck body 2. This non-rotation mechanism 6 includes a thrust ball 62 fitted within a ball engaging hole 61, a guide recess 63 for guiding the thrust ball 62 along the axial direction X, an increased width portion 64 formed on the axial base end side X2 of the guide recess 63, and a pair of circumferential abutment faces (not shown) which come into abutment against the thrust ball 62 on the opposed sides in the circumferential direction about the axis AX. Incidentally, in the following discussion, the circumferential direction about the axis AX will be referred to simply as the "circumferential direction".

The ball engaging hole 61 is provided at a portion in the circumferential direction of the leading end outer circumferential face 23a of the leading end portion 23. The thrust ball 62 is retained within the ball engaging hole 61. The guide recess 63 is provided at a portion in the circumferential direction of the inner circumferential face of the first holder member 31. The guide recess 63 is formed concave from the inner circumferential face toward the radial outer side R1 of the first holder member 31 and formed like a groove that extends along the axial direction X. When the holder 3 together with the nut N is to be attached to the chuck body 2, the thrust ball 62 held within the ball engaging hall 61 will enter this guide recess 63 from the end portion on the axial base end side X2 of the guide recess 63. The increased width portion 64 is formed to be cut away on the radial outer side R1 at the end portion on the axial base end side X2 of the guide recess 63. This increased width portion 64 serves to facilitate entrance of the thrust ball 62 from the end portion on the axial base end side X2 of the guide recess 63. Though not shown, on opposed sides in the circumferential direction of the ball engaging hole 61 and the guide recess 63, there are formed a pair of circumferential abutment faces. These circumferential abutment faces are configured to come into abutment against the thrust ball 62 in the circumferential direction. With establishment of this abutment, the first holder member 31 having the guide recess 63 and the chuck body 2 having the ball engaging hole 61 become non-rotatable about the axis AX. On the other hand, the guide recess 63 which guides the thrust ball 62 extends along the axial direction X, so the first holder member 31 is movable relative to the chuck body 2 to the axial base end side X2. Therefore, with the non-rotation mechanism 6 described above, relative rotation between the holder 3 and the chuck body 2 about the axis Ax is restricted and relative movement therebetween along the axial direction X is possible.

The tool chuck 1 further includes a holder retraction mechanism 7 for retracting the holder 3 toward the base end portion 21 side of the chuck body 2 upon the movement of the nut N along the axial direction X via meshing between the nut N and the intermediate portion 22 of the chuck body 2. The holder retraction mechanism 7 consists essentially of an annular space 71 formed along the circumferential direction and a plurality of radial balls 72 fitted in the annular space 71.

In operation, when the nut N is rotated about the axis AX, the radial balls 72 are rotated in association therewith. Therefore, relative to the holder 3 whose rotation about the axis AX is restricted by the non-rotation mechanism 6, the nut N is rotatable about the axis AX. Further, the radial balls 72 disposed in the annular space 71, i.e. between the nut N and the holder 3 in the radial direction R are placed in abutment against an axial abutment face FX on the opposed sides across the axis AX. Thus, with the movement of the nut N in the axial direction N in association with the meshing between the nut N and the chuck body 2, the radial balls 72 will be pressed against the axial abutment face FX, so that the nut N and the holder 3 will be moved together along the axial direction X via the radial balls 72. Therefore, with the holder retraction mechanism 7, relative rotation between the nut N and the holder 3 is allowed and at the same time the nut N and the holder 3 are movable together along the axial direction X.

The tool chuck 1 further includes a collet pressing mechanism 8 configured to press the collet 4 to the far inner side of the receiving portion 25 of the chuck body 2 in association with movement of the holder 3 to the axial base end side X2. This collet pressing mechanism 8 includes a first outer abutment face 8a formed in the outer circumference of the collet 4 and a first inner abutment face 8b which is formed in the inner circumference of the holder 3 and which also comes into abutment against the outer abutment face 8a. In the instant embodiment, the first inner abutment face 8b is formed in the inner circumference of the second holder member 32. The first outer abutment face 8a is formed in the outer circumference of the collet 4 and at an area thereof overlapped with the second holder member 32 as viewed along the radial direction R. The first outer abutment face 8a and the first inner abutment face 8b are formed as bulging in the radial direction R and in abutment against each other. Therefore, the first outer abutment face 8a and the first inner abutment face 8b are configured to be able to transmit at least forces effective in the axial direction X to each other. With this arrangement, the collet pressing mechanism 8 is capable of pressing the collet 4 to the far inner side (the axial base end side X2) of the receiving portion 25 of the chuck body 2. Further, the tool chuck 1 includes also a collet pulling mechanism 10 for pulling the collet 4 to the axial leading end side X1 relative to the chuck body 2 in association with movement of the holder 3 to the axial leading end side X1. This collet pulling mechanism 10 includes a second outer abutment face 10a formed in the outer circumference of the collet 4 and a second inner abutment face 10b formed in the inner circumference of the holder 3 and coming into abutment against the second outer abutment face 10a. The second outer abutment face 10a and the second inner abutment face 10b are inclined so that their diameters progressively increase toward the axial leading end side X1. With establishment of abutment between these second outer and inner abutment faces 10a, 10b, force along the axial direction X can be transmitted.

The holder 3 includes a movement allowing mechanism 9 for moving relative movement of the holder 3 relative to the nut N along the axial direction X when the nut N is moved relative to the chuck body 2 along the axial direction X. Further, the first holder member 31 and the second holder member 32 are configured to be movable relative to each other along the axial direction X. In the instant embodiment, the movement allowing mechanism 9 is configured to allow movement of the second holder member 32 relative to the nut N along the axial direction X when the nut N is moved relative to the chuck body 2 along the axial direction X.

Figure 2:
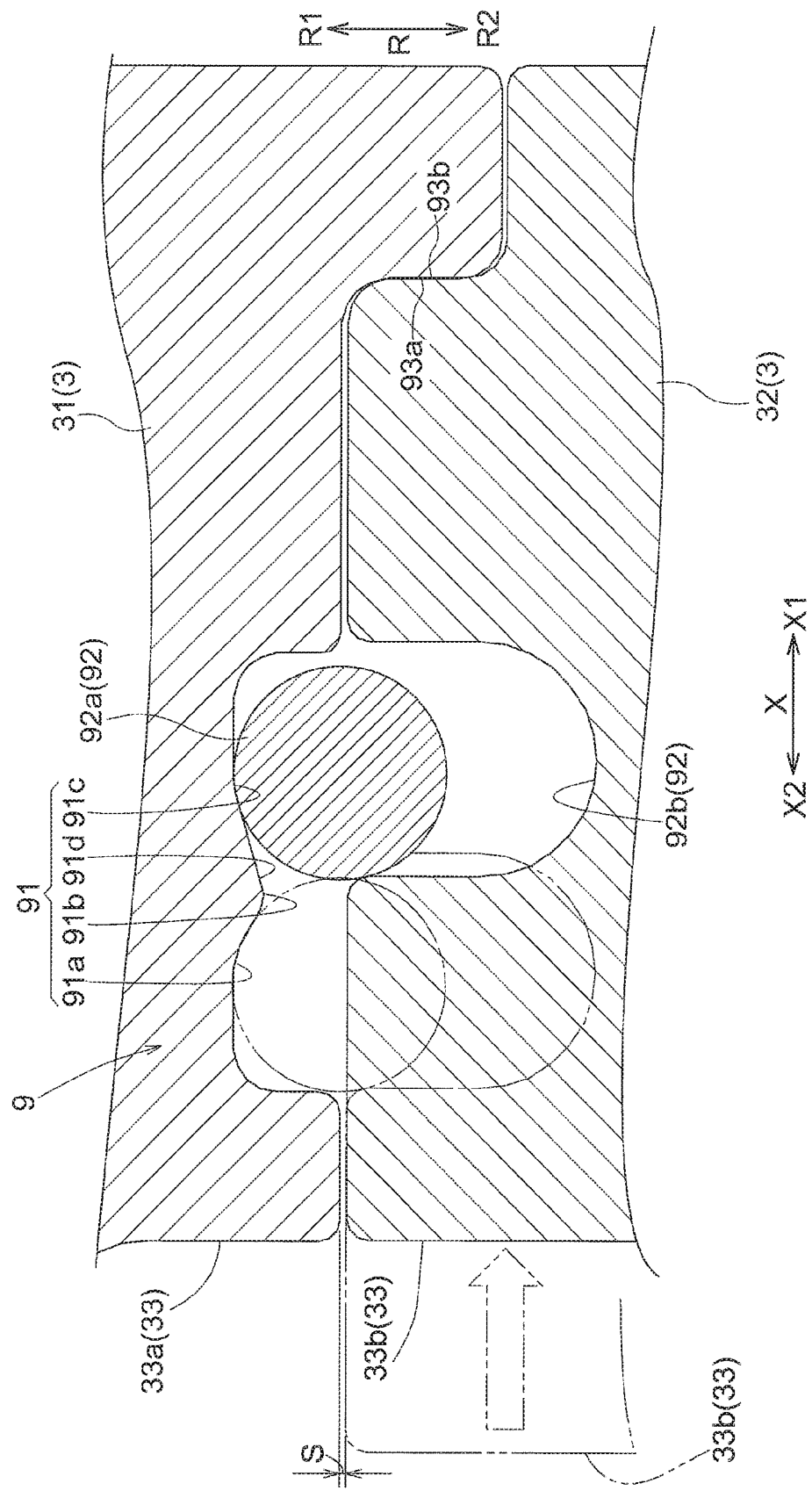
FIG. 2 is a section view showing principal portions of the tool chuck.

As shown in FIG. 2, the movement allowing mechanism 9 includes an engaging protruding portion 92 provided in either one of the first holder member 31 and the second holder member 32 which one is provided in the circumferential direction relative to the axis AX and an engaged receding portion 91 provided in the other thereof in the circumferential direction and engageable with the engaging protruding portion 92. Further, the movement allowing mechanism 9 has a gap S in the radial direction R between the first holder member 31 and the second holder member 32. This gap S allows the movement of the second holder member 32 in the radial direction R. Thus, the second holder member 32 will follow the collet 4 in the radial direction R when this collet 4 is being pressed against the receiving portion 25. More particularly, when the first outer abutment face 8a of the collet 4 moves in the radial direction R, the first inner abutment face 8b of the second holder member 32 will follow the first outer abutment face 8a. Also, when the collet 4 is not being pressed against the receiving portion 25, the second holder member 32 will move to bring its axis into agreement with the axis AX and the collet 4 will follow this second holder member 32 in the radial direction R. That is, the movement of the second holder member 32 along the radial direction R promotes or facilitates agreement of the axis of the collet 4 with the axis AX.

The engaging protruding portion 92 is comprised of a groove portion 92b provided in either one of the first holder member 31 and the second holder member 32 in the circumferential direction and an elastic ring 92a disposed in the groove portion 92b with a part of the elastic ring 92a protruding from the groove portion 92b. In the instant embodiment, the groove portion 92b is provided along the entire circumference in the outer circumference of the second holder member 32. The section of the elastic ring 92a along the axial direction X is round (circular). In the instant embodiment, the engaging protruding portion 92 including the elastic ring 92a and the groove portion 92b is provided along the entire circumference in the outer circumference of the second holder member 32. The engaging protruding portion 92 is elastically deformable in the radial direction R by the elasticity of the elastic ring 92a for guiding to the groove portion 92b.

In the instant embodiment, the engaged receding portion 91 is provided along the entire circumference in the inner circumference of the first holder member 31. The engaged receding portion 91 is configured to be capable of being engaged with the engaging protruding portion 92 provided in the second holder member 32. The engaged receding portion 91 includes a pair of small receding portions 91a, 91c disposed side by side along the axial direction X and holding the engaging protruding portion 92 and a small protrusion 91b provided between the pair of small receding portions 91a, 91c and configured to elastically deform the engaging protruding portion 92 in the radial direction R. In the instant embodiment, the pair of small receding portions 91a, 91c are comprised of the base end side small receding portion 91a disposed on the axial base end side X2 and the leading end side small receding portion 91c disposed on the axial leading end side X1. The base end side small receding portion 91a and the leading end side small receding portion 91c have an approximately same shape. In the following discussion, the base end side small receding portion 91a and the leading end side small receding portion 91c may sometimes be collectively referred to as "the pair of small receding portions 91a, 91c". The respective lengths in the axial direction X of the pair of small receding portions 91a, 91c are formed longer than the length of the engaging protruding portion 92 in the axial direction X. Therefore, each one of the pair of small receding portions 91a, 91c is capable of holding the engaging protruding portion 92. In the instant embodiment, each one of the pair of small receding portions 91a, 91c is capable of holding the elastic ring 92a and its depth is approximately a half of that of the elastic ring 92a. The small protrusion 91b is formed to protrude to the radial inner side R2. In the instant embodiment, the small protrusion 91b is disposed between the base end side small receding portion 91a and the leading end side small receding portion 91c.

Next, a method of holding the tool 5 using the tool chuck 1 will be explained. The method of holding the tool 5 includes: a first step of pressing the collet 4 to the far inner side of the receiving portion 25 when the nut N, the holder 3 and the collet 4 are to be mounted to the chuck body 2; a second step of causing the movement allowing mechanism 9 to move the second holder member 32 (holder 3) relative to the chuck body 2 to a leading end side of the receiving portion 25 as receiving a reaction force from the pressing at the first step; and a third step of pressing the collet 4 again toward the far inner side of the receiving portion 25 after the second step, thus fixing the tool 5 to the chuck body 2. The first, second and third steps are carried out continuously in the continued process of screwing the nut N to the chuck body 2. However, for the sake of readiness of explanation, in the following, these three steps will be explained separately.

Figure 3:
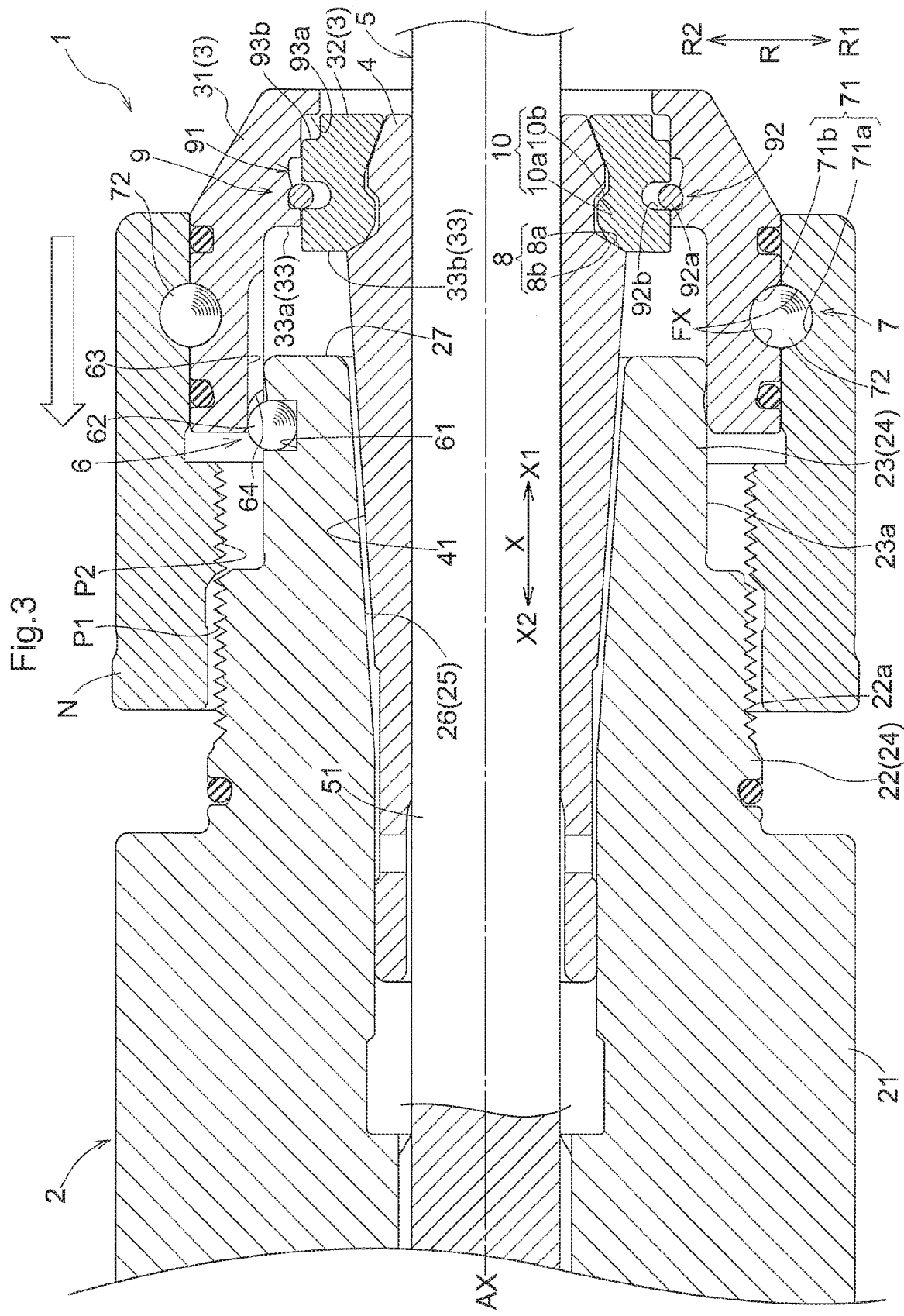
FIG. 3 is a view illustrating how a nut is screwed onto a chuck body.

Firstly, as shown in FIG. 3, under the state of the nut N, the first holder member 31, the second holder member 32, the collet 4 and the tool 5 being assembled to each other, the collet 4 is inserted toward the far inner side (the axial base end side X2) of the receiving portion 25 of the chuck body 2. In the state shown in FIG. 3, no meshing has been established yet between the male screw P1 of the intermediate portion 22 of the chuck body 2 and the female screw P2 of the nut N. When the collet 4 is to be inserted into the receiving portion 25, the collet 4 will be inserted into the receiving portion 25 while placing the disposing position in the circumferential direction of the guide recess 63 formed in the first holder member 31 in alignment with the disposing position in the circumferential direction of the thrust ball 62 held in the ball engaging hole 61 at the leading end portion 23 of the chuck body 2. Since the increased width portion 64 flared in the radial direction R is formed at the leading end on the axial base end side X2 of the guide recess 63, the thrust ball 62 can be smoothly guided into the guide recess 63.

Figure 4:
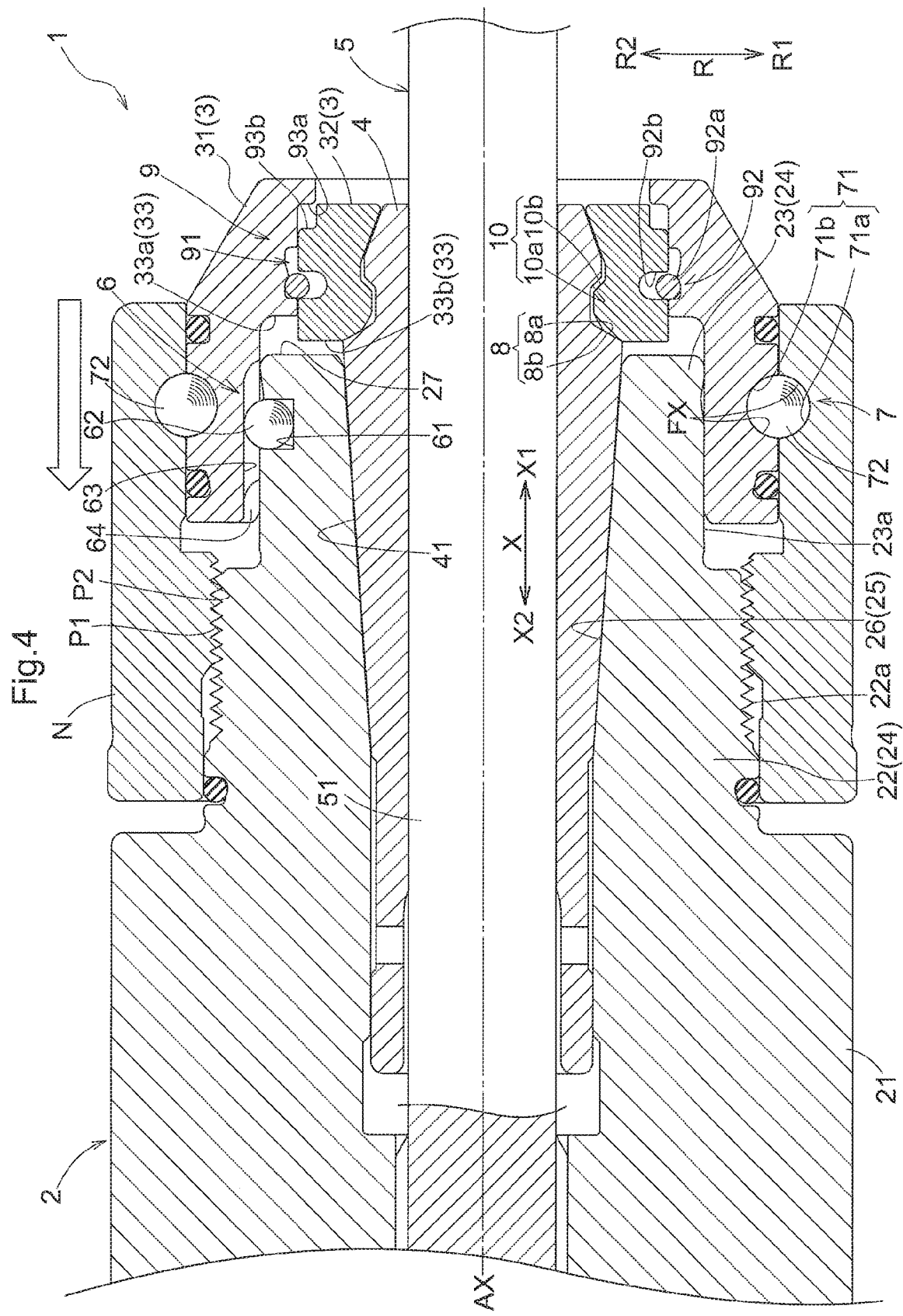
FIG. 4 is a view illustrating how a collet is pushed to an inner side of a receiving portion.

Next, the first step is carried out for inserting the collet 4 to the far inner side of the receiving portion 25. As illustrated in FIG. 4, as the nut N is progressively screwed into the chuck body 2, with guiding of the thrust ball 62 into the guide recess 63, the thrust ball 62 will come into abutment against the unillustrated circumferential abutment faces formed in the guide recess 63 and the ball engaging hole 61, whereby the first holder member 31 (holder 3) becomes non-rotatable relative to the chuck body 2. On the other hand, since the guide recess 63 into which the thrust ball 62 is guided extends along the axial direction X, the first holder member 31 is movable relative to the chuck body 2 to the axial base end side X2.

While the first holder member 31 is non-rotatable about the axis AX, the nut N connected to the first holder member 31 on the radial outer side R1 is rotatable about the axis AX due to rolling of the radial balls 72 constituting the holder retraction mechanism 7. Since the radial balls 72 are placed in abutment against the axial abutment face FX in the axial direction X, with the movement of the nut N to the axial base end side X2 in association with the meshing between the nut N and the chuck body 2, the nut N and the first holder member 31 are moved together toward the axial base end side X2.

FIG. 4 shows a state of continued meshing of the nut N to the chuck body 2.

As indicated also by a virtual line (two-dot chain line) in FIG. 2, in the above state, the elastic ring 92a is engaged in the base end side small receding portion 91a and also this elastic ring 92a is placed in contact with the small protrusion 91b from the axial base end side X2. Since the elastic ring 92a is placed in contact with the small protrusion 91b, movement of the second holder member 32 to the axial leading end side X1 is temporarily inhibited. The second holder member 32 pushes the collet 4 to the axial base end side X2 via the first outer abutment face 8a provided adjacent the end portion on the axial leading end side X1 of the collet 4 and the first inner abutment face 8b provided in the inner circumference of the second holder member 32. Under this state, the tapered inner circumferential face 26 formed in the receiving portion 25 and the tapered outer circumferential face 41 formed in the collet 4 are placed abutment against each other. Since the tapered inner circumferential face 26 and the tapered outer circumferential face 41 have progressively increasing diameters toward the axial leading end side X1, the abutment therebetween causes the collet 4 to provide a force for pressing the receiving portion 25 to the axial base end side X2. Further, with further continuation of meshing of the nut N to the chuck body 2, the force of the collet 4 for pressing the receiving portion 25 progressively increases and as a reaction force thereto, the receiving portion 25 provides a force for pressing the collet 4 to the axial leading end side X1.

Next, the second step is carried out for causing the movement allowing mechanism 9 to move the second holder member 32 relative to the chuck body 2 to the leading end side of the receiving portion 25. As shown by the virtual line in FIG. 2 and also in FIG. 5, the elastic ring 92a and the small protrusion 91b are placed in abutment against each other in the axial direction X and this elastic ring 92a has a round shape as seen in its section. So, when the pressing force exceeds the inhibiting force, the elastic ring 92a, as receiving a force from the small protrusion 91b toward the radial inner side R2, is elastically deformed (reduced in its diameter) toward the radial inner side R2 and eventually overrides the small protrusion 91b. With this, the second holder member 32 becomes movable to the axial leading end side X1, so the second holder member 32 is moved to the axial leading end side X1. Then, when a first restricting face 93a of the first holder member 31 and a second restricting face 93b of the second holder member 32 come into abutment against each other, the second holder member 32 becomes unmovable to the axial leading end side X1 any farther (see FIG. 2). With the movement of the second holder member 32 to the axial leading end side X1, the pressed contact between the tapered inner circumferential face 26 and the tapered outer circumferential face 41 is weakened. Namely, it is possible to maintain a high precision mounting state relative to the axis due to lightly pressed-in state. Also, even if the axis of the collet 4 is inclined relative to the axis AX when the collet 4 has been inserted into the receiving portion 25, the collet 4 will be readily corrected to assume a posture along the axis AX. Consequently, the axis of the collet 4 can be readily brought into agreement with the axis AX. Further, in the instant embodiment, since the gap S is formed in the radial direction R between the first holder member 31 and the second holder member 32, the second holder member 32 can move in the radial direction R to further facilitate establishment of agreement between the axis of the collet 4 gripped by this second holder member 32 and the axis AX.

Next, after the second step, the third step is carried out for pressing again the collet 4 to the far inner side of the receiving portion 25, thereby to fix the tool 5 to the chuck body 2. As shown in FIG. 2, under the state wherein the first restricting face 93a of the first holder member 31 and the second restricting face 93b of the second holder member 32 are placed in abutment against each other, the nut N, the first holder member 31, the second holder member 32 and the collet 4 can move together toward the axial base end side X2. From this state, as meshing of the nut N to the chuck body 2 is continued, the nut N, the first holder member 31, the second holder member 32 and the collet 4 are moved together toward the axial base end side X2 (see FIG. 6). With this, the collet 4 will be pressed progressively strongly by the chuck body 2, whereby the holding of the tool 5 will be completed.

Next, a method of removing the tool 5 using the tool chuck 1 will be explained.

This method of removing the tool 5 includes: a first removing step for moving the nut N in the direction away from the chuck body 2 with the engaging protruding portion 92 being kept in contact with the inclined face 91d; a second removing step for engaging the engaging protruding portion 92 with the small receding portion 91a; and a third removing step for moving the holder 3 and the collet 4 together in the direction away from the chuck body 2, thereby to remove the tool 5 from the chuck body 2.

As shown in FIG. 6, while the elastic ring 92a is kept in contact with the inclined face 91d (see also FIG. 2), the nut N is moved to the axial leading end side X1 (first removing step). In this, due to the contact between the elastic ring 92a and the inclined face 91d, the first holder member 31 and the nut N will be moved smoothly with less resistance relative to each other to the axial leading end side X1 relative to the second holder member 32. And, with continuation of the movement of the nut N to the axial leading end side X1, the base end side small receding portion 91a and the elastic ring 92a are engaged with each other, overriding the small protrusion 91b (second removing step). With establishment of this engagement, movement of the first holder member 31 and the nut N relative to the second holder member 32 to the axial leading end side X1 is inhibited. Therefore, from this condition, as the nut N is moved to the axial leading end side X1, the nut N, the first holder member 31 and the second holder member 32 are moved together to the axial leading end side X1. As shown in FIG. 7, with further movement of the nut N to the axial leading end side X1, the second holder member 32 is moved to the axial leading end side X1 and the first outer abutment face 8a and the first inner abutment face 8b are detached from each other and also the second outer abutment face 10a and the second inner abutment face 10b are brought into abutment against each other. With this, in addition to the nut N, the first holder member 31 and the second holder member 32, the collet 4 too becomes movable together along the axial leading end side X1. And, as the second holder member 32 and the collet 4 are moved together to the axial leading end side X1, the collet 4 will be pulled, whereby the tool 5 gripped by the collet 4 is removed from the chuck body 2 (third removing step). In this way, by carrying out the first through third removing steps, the tool 5 can be removed from the chuck body 2.

Next, other embodiments of the present invention will be explained.

(1) In the foregoing embodiment, there was explained an example in which the engaging protruding portion 92 consists of the elastic ring 92a and the groove portion 92b. However, the present invention is not limited to this arrangement. Namely, the engaging protruding portion can be provided as an integrated body formed to protrude in the radial direction.

(2) In the foregoing embodiment, there was explained an example in which the engaging protruding portion 92 is provided in the second holder member 32 and the engaged receding portion 91 is provided in the first holder member 31. However, the present invention is not limited to this arrangement. Namely, the engaging protruding portion may be provided in the first holder member and the engaged receding portion may be provided in the second holder member. Further, in such case too, the engaging protruding portion may be comprised of the elastic ring and the groove portion.

(3) In the foregoing embodiment, there was explained an example in which the elastic ring 92a has a round (circular) section. However, the present invention is not limited to this arrangement. Namely, it will suffice for either one of the small protrusion and the elastic ring to come into contact with each other in the axial direction to generate a force in the radial component. For instance, the leading end of the small protrusion can be formed spherical. Further, the contacting faces of the small protrusion and the elastic ring may be tapered faces.

(4) The present invention is not limited to the respective embodiments described above, but may be modified in any way within a range not depart from its essence. And, the respective embodiments described above can be combined in any manner within a range resulting in contradiction.

REFERENCE SIGNS LIST

1: tool chuck
2: chuck body
3: holder
4: collet
5: tool
9: movement allowing mechanism
25: receiving portion
31: first holder member
32: second holder member
91: engaged receding portion
91a: base end side small receding portion
91b: small protrusion
91c: leading end side small receding portion
91d: inclined face
92: engaging protruding portion
92a: elastic ring
92b: groove portion
AX: axis
N: nut
R: radial direction
X: axial direction

The invention claimed is:

1. A tool chuck comprising:
a collet for gripping a tool;
a chuck body having, at a leading end thereof, a receiving portion for receiving the collet inserted therein along an axis thereof;
a holder containing the collet therein and configured to be movable together with the collet along an axial direction;
a nut fitted on the chuck body and containing the holder; and
the holder having a movement allowing mechanism for allowing the holder to move relative to the nut along the axial direction when the nut is moved relative to the chuck body along the axial direction, wherein:
the holder includes a first holder member contained in the nut and a second holder member contained in the first holder member and containing the collet;
the first holder member and the second holder member are movable relative to each other along the axial direction;
the first holder member and the second holder member are formed annular about the axis;
the movement allowing mechanism includes an engaging protruding portion provided in one of the first holder member and the second holder member along a circumferential direction relative to the axis and an engaged receding portion provided in the other of the first and second holder members along the circumferential direction and engageable with the engaging protruding portion;
the engaging protruding portion is elastically deformable in the radial direction; and
the engaged receding portion includes a pair of small receding portions provided side by side along the axial direction and holding the engaging protruding portion and a protrusion provided between the small receding portions.

2. The tool chuck of claim 1, wherein the engaged receding portion includes an inclined face between one of the pair of small receding portions which one is located farther from the chuck body and the protrusion.

3. A tool removing method for removing a tool fixed to the chuck body using the tool chuck of claim 2, the method comprising:
a first removing step for moving the nut in the direction away from the chuck body with the engaging protruding portion being kept in contact with the inclined face;
a second removing step for engaging the engaging protruding portion with the small receding portion; and
a third removing step for moving the holder and the collet together in the direction away from the chuck body, thereby to remove the tool from the chuck body.

4. The tool chuck of claim 2, wherein the engaging protruding portion is comprised of a groove portion provided in the circumferential direction and an elastic ring disposed in the groove portion with the elastic ring protruding from the groove portion.

5. A tool holding method for fixing a tool to the chuck body using the tool chuck of claim 1, the method comprising:
a first step of pressing the collet to a far inner side of the receiving portion when the nut, the holder and the collet are to be mounted to the chuck body;
a second step of causing the movement allowing mechanism to move the holder relative to the chuck body to a leading end side of the receiving portion as receiving a reaction force from the pressing at the first step; and
a third step of pressing the collet again toward the far inner side of the receiving portion after the second step, thus fixing the tool to the chuck body.

6. The tool chuck of claim 1, wherein the engaging protruding portion is comprised of a groove portion provided in the circumferential direction and an elastic ring disposed in the groove portion with the elastic ring protruding from the groove portion.

* * * * *